June 7, 1938.  J. E. GRAY ET AL  2,120,067
FITTING AND THE MANUFACTURE THEREOF
Filed Oct. 1, 1937
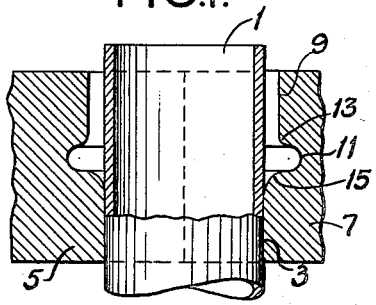
FIG.1.
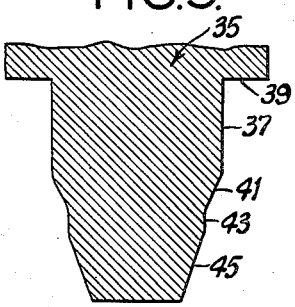
FIG.5.
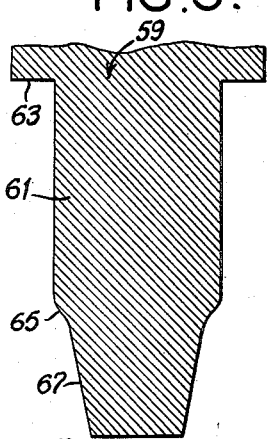
FIG.8.
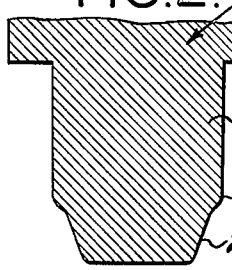
FIG.2.
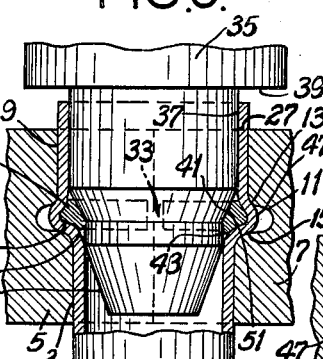
FIG.6.
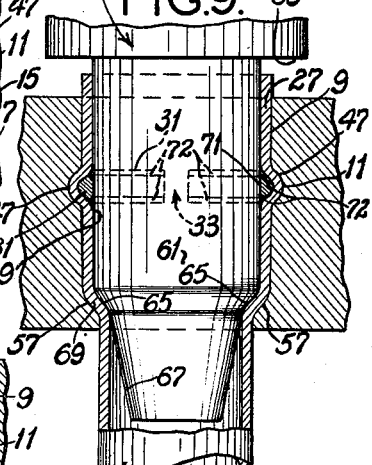
FIG.9.
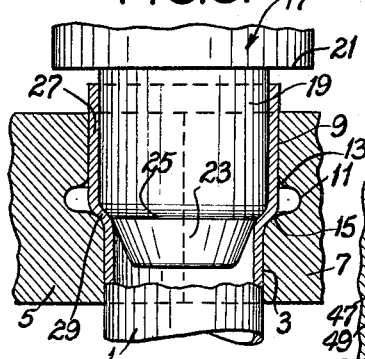
FIG.3.
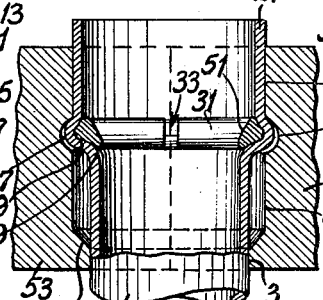
FIG.7.
FIG.10.
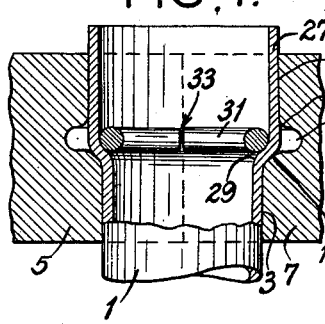
FIG.4.
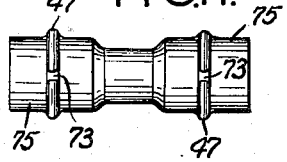
FIG.11.
John E. Gray,
William M. Parker,
Inventors,
Delos G. Haynes,
Attorney.

Patented June 7, 1938

2,120,067

UNITED STATES PATENT OFFICE 2,120,067

FITTING AND THE MANUFACTURE THEREOF

John E. Gray and William M. Parker, Port Huron, Mich., assignors to Mueller Brass Co., Port Huron, Mich., a corporation of Michigan Application October 1, 1937, Serial No. 166,721

9 Claims. (Cl. 29—157)

This invention relates to fittings, and with regard to certain more specific features, to wrought metal pipe fittings, and to the manufacture thereof.

Among the several objects of the invention may be noted the provision of a wrought metal pipe fitting which has embedded therein a ring of solder material which is later adapted, in connection with the use of the fitting, to make a joint; the provision of a fitting of the class described in which the solder ring is so positioned in the fitting as to offer no obstruction whatsoever to the introduction of a pipe therein, as in making a joint; the provision of a fitting of the class described which has an exterior conformation indicating that it is of a particular type; the provision of a fitting of the class described wherein a close fit is had between the fitting itself and the inserted solder ring, thereby providing for excellent heat conduction from the exterior of the fitting to the solder ring in the course of making a joint with the fitting; the provision of a method of manufacturing fittings of the class described, wherein a suitable length of tubular material is subjected to a series of expanding operations to reach the ultimate fitting form, at least one of said expanding operations being inclusive of the formation of an internal groove in the fitting by expanding therein a ring of solder material; the provision of a method of manufacturing fittings of the class described, which method includes the step of causing an inserted solder ring to expand to form its own recess, and consequently tightly to conform to said recess; and the provision of a fitting and of a method of the class described, which are economical in construction and operation. Other objects will be in part obvious and in part pointed out hereinafter.

The invention accordingly comprises the elements and combinations of elements, steps and sequence of steps, features of construction and synthesis, and arrangements of parts, which will be exemplified in the structures and processes hereinafter described, and the scope of the application of which will be indicated in the following claims.

In the accompanying drawing, in which are illustrated several of various possible embodiments of the invention, Fig. 1 is a cross section of a die, showing a length of tubing therein ready for a first expanding operation;

Fig. 2 is a cross section of a ram adapted to cooperate with the die of Fig. 1;

Fig. 3 is a cross sectional view of the die of Fig. 1, and contained tubing, after the application of the ram of Fig. 2 thereto;

Fig. 4 is a cross section illustrating the next step in the manufacture of a fitting according to the present invention;

Fig. 5 is a cross section of a second ram;

Fig. 6 is a cross section illustrating the result of applying the ram of Fig. 5 to the die and contained tubing as shown in Fig. 4;

Fig. 7 shows a partly formed fitting as at the termination of the Fig. 6 operation, and as placed in a subsequent die;

Fig. 8 is a cross section of a third ram;

Fig. 9 is a cross section illustrating the application of the ram of Fig. 8 to the partially completed fitting in the die of Fig. 7;

Fig. 10 is a side elevation of a return bend fitting made in accordance with the present invention; and, Fig. 11 is a side elevation of a coupling-type fitting involving the present invention.

Similar reference characters indicate corresponding parts throughout the several views of the drawing.

Referring now more particularly to Fig. 1, numeral 1 indicates a length of relatively thin-walled, ductile metallic tubing, such as wrought copper or the like, which is to be formed into a pipe fitting in accordance with the present invention. The pipe 1 is shown as positioned in the bore 3 of a split die, the separate halves of which are indicated by numerals 5 and 7. The split in the parts 5 and 7 of the die occurs along the diameter of the bore 3, as is customary in dies of this sort. Pipe 1 is relatively tightly received in the bore 3. At the upper end of the halves 5 and 7 of the die, the bore 3 enlarges into a bore 9 of relatively larger diameter, and between the bore 3 and the bore 9, a relatively deep outwardly-extending groove 11 is provided. Preferably, fillets 13 and 15 are provided between the bore 9 and the groove 11, and between the groove 11 and the bore 3, respectively.

In Fig. 2, there is illustrated a ram 17, which comprises a cylindrical portion 19 terminated at its upper end by a shoulder 21, and at its lower end by a tapered portion 23. A rounded shoulder 25 is preferably provided between the cylindrical portion 19 and the tapered portion 23.

Fig. 3 indicates what happens when the ram 17 of Fig. 2 is forced into the assembly of pipe 1 and split die, as shown in Fig. 1. It will be seen that the cylindrical portion 19 of the ram 17 has reacted against and expanded the end of pipe 1 into a belled-out or expanded socket portion 27, which is inwardly terminated by a constriction or shoulder 29 formed by the reaction of shoulder 25 on the ram 17 against the fillet 15 in the die.

The ram 17 is then removed from the die, and the next step in manufacturing the fitting according to the present invention comprises dropping into the expanded socket portion 27 of the pipe 1, a ring 31 of solder material. Ordinarily, this ring 31 is of the split type, having been made from wire, and numeral 33 accordingly indicates the gap between the ends of the ring 31. It is advantageous that the ring 31 be made of a relatively hard soldering material, such as the so-called silver solders, although softer solders are usually found to be satisfactory. The ring 31 rests on the shoulder 29 in the expanded socket portion 27 of pipe 1.

Fig. 5 shows a second ram 35 which is used in connection with the next step of the present invention. The ram 35 comprises a cylindrical portion 37, which is of substantially the same diameter as the cylindrical portion 19 of ram 17, and which is similarly upwardly terminated by a shoulder 39. Downwardly, the cylindrical portion 37 terminates in a tapered portion 41, which is relatively short, and which in turn terminates in a cylindrical portion 43 of somewhat smaller diameter than the cylindrical portion 37. A second tapered portion 45 downwardly terminates the cylindrical portion 43, and the ram 35 itself.

The diameter of the cylindrical portion 43 is preferably somewhat greater than the inner diameter of the solder ring 31, and is most advantageously made about the same diameter as the inside diameter of the unexpanded pipe 1.

When the ram of Fig. 5 is applied to the assembly shown in Fig. 4, first the tapered walls of tapered portion 45 come into contact with the inner edge of split ring 31. As more and more force is applied to the ram 35, the reaction outwardly against the split ring 31 is increased, and said ring, having no place else to flow, expands radially outwardly, thereby expanding a portion of the side wall of the pipe into the groove 11 in the die, thereby forming in the pipe an outwardly extending bead 47. As yet, however, the bead 47 does not ordinarily extend to the bottom of groove 11. As the ram 35 is progressively inserted into the die, the solder ring 31 is progressively forced farther out, until it finally passes over the cylindrical portion 43 and into engagement with the tapered portion 41 of still greater diameter. By this time, the elements have the positions shown in Fig. 6. From Fig. 6, it will be seen that, by reason of the fact that the bead 47 is actually formed by the expanding solder ring 31, said solder ring is in tight contact with the inside of said bead, which constitutes a groove 49. After the ram 35 has reached the position shown in Fig. 6, it is preferably withdrawn from the die, when it will be found that the solder ring 31, which has by now changed its shape, has a somewhat conical inner face 51.

The partially completed fitting is now removed from the die of Figures 1, 3, 4 and 6, and placed in a new split die, of the type shown in Fig. 7. As in the case of Fig. 1, the split die of Fig. 7 has two halves 53 and 55. The principal difference between the Fig. 7 die and the Fig. 1 die is that the bore 9 of larger diameter is now extended in length so that it is positioned on both sides of the groove 11, terminating downwardly as a shoulder 57 with which it is connected to the now relatively short bore 3 of the die.

The partially completed fitting, as it comes from the Fig. 6 operation, is now placed in the die of Fig. 7, with the expanded socket 27 in its same relative location in the die, and with the partially formed bead 47 positioned in the groove 11. To the assembly as thus shown in Fig. 7, a ram of the type shown in Fig. 8 is now applied. The ram 59, as shown in Fig. 8, comprises a relatively long cylindrical portion 61, which is of the same, or a slightly greater diameter than the similar cylindrical portions 37 and 19 of the rams 35 and 17, respectively. The cylindrical portion 61 is upwardly terminated by a shoulder 63, and downwardly by an inwardly rounded shoulder 65, which in turn terminates in a tapered portion 67.

As the ram 59 is forced into the partially completed fitting in the die, as shown in Fig. 7, the tapered portion 67 comes to bear against the sloping face 51 of the solder ring 31, and thereafter against the unexpanded portion of the pipe 1 immediately beneath the bead 47. Thereafter, the rounded shoulder 65 on the ram 59 comes progressively into contact with the same portions, and the result of a complete insertion of the ram 59 is shown in Fig. 9. It will be seen that, not only has the bead 47 been expanded so that it now completely fills the groove 11 in the die, but the portion of the pipe 1 beneath said bead 47 has also been expanded into the die and is now inwardly terminated by a constricting shoulder 69 which is formed against the shoulder 57 in the die. The inner surface of the solder ring 31 has now flattened out so that its inner surface is flush or even with the inner wall of the expanded socket portion, as indicated at numeral 71, although, depending upon the relative hardness of the solder material, it may not (and ordinarily does not) completely fill the bead 47, but leaves shallow grooves 72 on each side of itself.

After the ram 59 has progressed to the position shown in Fig. 9, it is withdrawn from the die and the fitting itself, which is now substantially completed, is likewise removed from the die. The fitting, as it comes from the Fig. 9 operation, needs only a few finishing operations, such as a trimming of the end thereof, to complete its manufacture.

If the solder ring 31 used is of the split ring type, as is preferred with the present invention, it will be seen that the gap 33 between the ends thereof become progressively larger throughout the steps of manufacture represented successively by Figures 6 and 9. Thus, in Figures 6 and 9, the gap 33 is shown as progressively wider than it is in Fig. 4, for example. Because of this gap in the solder ring 31, there will be a region or gap on the outer face of the finished fitting where the bead 47 will not be expanded to quite as great an extent as it will around the remainder of the periphery of the fitting. This region, for example, is indicated by numeral 73 in Fig. 11. Fig. 11, by way of explanation, shows a coupling type fitting that is prepared in accordance with the present invention, by carrying out the expanding operations heretofore described on both ends of a length of tube. The Fig. 11 coupling is representative of the many types of pipe fittings that can be made in accordance with the present invention.

Fig. 10 represents a return bend, which is still another type of fitting that can readily be made in accordance with the present invention. The present invention similarly applies to such other type fittings as L's, T's, and the like.

The finished fitting, as shown in Figures 10 and 11, comprises an expanded or belled socket portion indicated by numeral 75, from which is further expanded a bead 47, the bead 47 being further characterized in the presence of the gap 73 hereinbefore mentioned. To make a joint with fittings of this type, a pipe or rod end is telescoped into the socket 75, and heat is then applied externally to the socket 75 in order to melt the solder ring 31, and cause the molten solder to flow, preferably by capillary attraction, throughout the interfacial region between the socket 75 and the end of the entering pipe. When the solder is then permitted to cool and solidify, it will be found that a secure, tightly-sealed joint is had between the pipe and the fitting. Of course, to facilitate the making of a joint, proper cleaning and fluxing operations are preferably employed prior to the actual soldering.

With certain metals, such as wrought copper, it is sometimes advisable to subject the pipe to annealings intermediate the various expanding operations, in order to retain the copper in a soft enough condition so that it readily flows as the rams are applied, without checking or cracking.

In the embodiment shown, the solder ring, and its consequent groove and bead, are positioned midway between the ends of the socket portion 75. It will of course be understood that by suitable dimensioning of the several rams and dies, this solder ring may be positioned at any other location along the length of the socket 75. If it is desired that the solder ring be located at the bottom of the socket 75, then the fitting may be considered as substantially completed when it comes from the Fig. 6 operation, possibly with the exception that, in this case, the ram 35 is driven somewhat farther into the die than as shown in Fig. 6.

The gap 73 in the bead 47 brought about by the expanded gap 53 between the end of split solder ring 31 is advantageous in several respects in the completed fitting. In the first place, it performs the identification function hereinbefore mentioned. Furthermore, it acts as a retainer for the solder ring 31 within the finished fitting, since it stops the ends of the split ring 31 from coming together and thus prevents the split ring 31 from shrinking in size and thus coming out of its groove. Even though the solder ring might not completely fall from the fitting under such circumstances, it would still project into the bore of the socket 75, and interfere with the proper insertion of a pipe in the fitting in order to make a joint. This gap 73 likewise serves, during the making of a joint, as a port for allowing the exit of flux or gases from the innermost part of the joint to the outside part of the joint.

While a split solder ring is preferred in connection with the present invention, for the reason that it provides the gap 73 hereinbefore referred to, it is by no means to be considered that the use of a solid stamped or otherwise formed solder ring is to be excluded. Using a solid solder ring, however, no gap 73 is provided, because the solid solder ring merely is stretched by the amount necessary to permit it to achieve the position shown in Fig. 9.

In some cases, it is advisable that either the ram or the die (with the contained pipe), or both, be rotated at the time that they are brought together. Such rotation aids in the expanding operation to be performed.

One of the principal features of the present invention is that the groove or bead in which the solder ring 31 is positioned, has been formed by forcible expansion of the same solder ring against the metal of the fitting. By reason of this method of formation, it is inherent that the solder ring is in firm, unbroken contact with the metal of the fitting along the entire region of juncture therebetween. This firm contact is of great utility in later making a joint, as it means that an unbroken path is provided for the conduction of heat from the outside of the fitting directly into the solder ring, in order to melt said ring. In previous cases, where a solder ring has been inserted into a pre-formed groove in a fitting, it has proved difficult, if at all possible, to get a firm unbroken contact between the solder ring and the wall of the fittings throughout the entire region of their juxtaposition.

As another consequence of the method by which the present fitting is formed, there is assurance, in connection with the fitting of the present invention, that the inner surface 71 of the ring 31 will be flush or even, and concentric, with the inner surface of the socket 75 of the fitting itself. In the aforesaid prior practice of expanding a ring into a preformed groove in a socket, this assurance could not be had, because frequently the expanded circular surface of the inserted solder ring was eccentric with respect to the surface of the fitting, a portion of the solder ring projecting into the socket and thus constituting an obstruction for the smooth insertion of a pipe in the course of making a joint. Furthermore, it is difficult to preform a groove in a socket of a fitting of the type herein concerned, and maintain said groove completely concentric with the socket itself.

In view of the above, it will be seen that the several objects of the invention are achieved and other advantageous results attained.

As many changes could be made in carrying out the above constructions and processes without departing from the scope of the invention, it is intended that all matter contained in the above description or shown in the accompanying drawing shall be interpreted as illustrative and not in a limiting sense.

We claim:

1. A relatively thin-walled wrought metal pipe fitting comprising a socket portion, a bead expanded outwardly from said socket portion, and a solder ring in said socket disposed inside of said bead and having an inner surface flush or even with the inner surface of said socket, said solder ring being split, with a gap between its ends, said bead being interrupted to provide an imperforate gap therein in which the gap of the solder ring is positioned.

2. A relatively thin-walled wrought metal pipe fitting comprising a socket portion, a bead expanded outwardly from said socket portion, and a solder ring in said socket disposed inside of said bead and having an inner surface flush or even with the inner surface of said socket, said solder ring being split, with a gap between its ends, said bead being interrupted to provide an imperforate gap therein in which the gap of the solder ring is positioned, the gap in said bead being visible from the exterior of said fitting.

3. The method of manufacturing a fitting of the class described which comprises expanding the end of a suitable tubular member to form a socket portion inwardly terminated by a shoulder, positioning a solder ring in said socket portion against said shoulder, and expanding said solder ring against said socket portion to form an outwardly extending bead thereon, and expanding the portion of the tubular member adjacent the solder ring, to approximately the diameter of said socket portion, with the solder ring remaining in the inside of said bead.

4. The method of manufacturing a fitting of the class described which comprises expanding the end of a suitable tubular member to form a socket portion inwardly terminated by a shoulder, positioning a split solder ring in said socket portion against said shoulder, and expanding said solder ring against said socket portion to open the ends of the ring to form a gap and to form an outwardly extending bead on the socket with a gap in the bead corresponding to the position of the gap in the solder ring, the solder ring remaining in the inside of said bead, with the gap in the bead receiving the gap in the solder ring, and thereafter further expanding the solder ring so that its surface becomes flush or even with the inside surface of said socket.

5. The method of manufacturing a fitting of the class described which comprises expanding the end of a suitable tubular member to form a socket portion inwardly terminated by a shoulder, positioning a solder ring in said socket portion against said shoulder, and expanding said solder ring against said socket portion to form an outwardly extending bead thereon, with the solder ring remaining in the inside of said bead, and thereafter expanding a region of the tubular member beyond said bead whereby said socket portion extends on both sides of said bead.

6. The method of manufacturing a fitting of the class described which comprises expanding the end of a suitable tubular member to form a socket portion inwardly terminated by a shoulder, positioning a solder ring in said socket portion against said shoulder, and expanding said solder ring against said socket portion to form an outwardly extending bead thereon, with the solder ring remaining in the inside of said bead, and thereafter expanding a region of the tubular member beyond said bead whereby said socket portion extends on both sides of said bead, and at the same time further expanding the solder ring so that its surface becomes flush or even with the inside surface of said socket.

7. The method as set forth in claim 5, in which the solder ring is a split ring, in consequence of the expansion of which split ring during the expansion of the socket the aforesaid bead is formed with a gap therein, which gap receives the gap between the ends of the split ring.

8. The method as set forth in claim 5 in which the successive expansions are performed in suitably shaped dies by the application of suitably shaped rams progressively to the aforesaid tubular member.

9. The method of manufacturing a fitting of the class described which comprises expanding the end of a suitable tubular member to form a socket portion inwardly terminated by a shoulder, positioning a split solder ring in said socket portion against said shoulder, expanding said solder ring against said socket portion to open the ends of the ring to form a gap and to form an outwardly extending bead on the socket with a gap in the bead corresponding to the position of the gap in the solder ring, the solder ring remaining inside of said bead, with the gap in the bead receiving the gap in the solder ring.

JOHN E. GRAY.
WILLIAM M. PARKER.